(12) United States Patent
Inoue et al.

(10) Patent No.: US 9,201,263 B2
(45) Date of Patent: Dec. 1, 2015

(54) LIQUID CRYSTAL DISPLAY AND LIQUID CRYSTAL DISPLAY PANEL

(71) Applicant: Samsung Display Co., Ltd., Yongin (KR)

(72) Inventors: Daisuke Inoue, Cheonan-si (KR); Soyoun Park, Suwon-si (KR); Taeho Kim, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 202 days.

(21) Appl. No.: 13/713,386

(22) Filed: Dec. 13, 2012

(65) Prior Publication Data

US 2013/0286332 A1 Oct. 31, 2013

(30) Foreign Application Priority Data

Apr. 25, 2012 (KR) ........................ 10-2012-0043223

(51) Int. Cl.
*G02F 1/1343* (2006.01)
*G02F 1/139* (2006.01)
*G02F 1/1335* (2006.01)
*G02F 1/1337* (2006.01)
*G02F 1/1333* (2006.01)

(52) U.S. Cl.
CPC .... *G02F 1/133514* (2013.01); *G02F 1/133707* (2013.01); *G02F 1/134363* (2013.01); *G02F 1/133371* (2013.01); *G02F 2001/134372* (2013.01)

(58) Field of Classification Search
CPC ............ G02F 1/1335; G02F 1/133371; G02F 2001/134372; G02F 1/134363; G02F 1/133707

USPC ................... 349/106, 107, 109, 141, 143, 144
See application file for complete search history.

(56) References Cited

U.S. PATENT DOCUMENTS

| | | | |
|---|---|---|---|
| 6,037,084 A | 3/2000 | Ting et al. | |
| 6,515,727 B2 * | 2/2003 | Yoon et al. | 349/143 |
| 7,443,468 B2 | 10/2008 | Okita et al. | |
| 2002/0008828 A1 * | 1/2002 | Park et al. | 349/141 |
| 2004/0189925 A1 * | 9/2004 | Ohmuro et al. | 349/144 |
| 2005/0052590 A1 * | 3/2005 | Ochiai et al. | 349/71 |
| 2009/0244467 A1 * | 10/2009 | Nomura et al. | 349/141 |
| 2009/0290106 A1 | 11/2009 | Song et al. | |
| 2010/0066952 A1 * | 3/2010 | Tsuchiya et al. | 349/106 |
| 2010/0231832 A1 * | 9/2010 | Maezawa et al. | 349/96 |

FOREIGN PATENT DOCUMENTS

| | | |
|---|---|---|
| JP | 2003-005213 | 1/2003 |
| JP | 2010-145825 | 7/2010 |
| JP | 2011-022448 | 2/2011 |
| KR | 10-2002-0026100 | 4/2002 |
| KR | 10-2002-0053576 | 7/2002 |
| KR | 10-2006-0107302 | 10/2006 |
| KR | 10-2010-0029237 | 3/2010 |

* cited by examiner

*Primary Examiner* — Dung Nguyen
*Assistant Examiner* — Tai Duong
(74) *Attorney, Agent, or Firm* — H.C. Park & Associates, PLC (57) ABSTRACT

A liquid crystal display includes a first substrate, a second substrate, and a liquid crystal layer disposed between the first and second substrates. The liquid crystal display includes first, second, and third sub-pixels respectively displaying red, green, and blue colors. The first, second, and third sub-pixels have different cell gaps from each other.

19 Claims, 12 Drawing Sheets

Fig. 7B

LIQUID CRYSTAL DISPLAY AND LIQUID CRYSTAL DISPLAY PANEL

CROSS-REFERENCE TO RELATED APPLICATION

This application claims priority from and the benefit of Korean Patent Application No. 10-2012-0043223, filed on Apr. 25, 2012, which is incorporated herein by reference for all purposes as if fully set forth herein.

BACKGROUND OF THE INVENTION

1. Field of the Invention

Exemplary embodiments of the present invention relate to a liquid crystal display and a liquid crystal display panel. More particularly, exemplary embodiments of the present invention relate to a liquid crystal display and a liquid crystal display panel capable of improving a display quality thereof.

2. Discussion of the Background

A liquid crystal display typically includes two substrates facing each other and a liquid crystal layer disposed between the two substrates. The liquid crystal display is classified into an in-plane switching (IPS) mode liquid crystal display, a vertical alignment (VA) mode liquid crystal display, and a plane-to-line switching (PLS) mode liquid crystal display depending on how the liquid crystal molecules are driven in the liquid crystal display.

The PLS mode liquid crystal display drives liquid crystal molecules of the liquid crystal layer using a horizontal electric field and a vertical electric field. The liquid crystal molecules of the liquid crystal layer are rotated substantially in parallel to the two substrates due to a fringe field.

For high-definition images, the PLS mode liquid crystal display includes a plurality of pixels. As a size of the pixels decreases, an aperture ratio of the pixels is reduced. As a result, the transmittance of the pixel is lowered.

SUMMARY OF THE INVENTION

Exemplary embodiments of the present invention provide a liquid crystal display having improved optical transmittance.

Additional features of the invention will be set forth in the description which follows, and in part will be apparent from the description, or may be learned by practice of the invention.

An exemplary embodiment of the present invention discloses a liquid crystal display which includes a first substrate, a second substrate facing the first substrate, a liquid crystal layer disposed between the first substrate and the second substrate and including liquid is crystal molecules having a negative anisotropic dielectric constant, and first, second, and third sub-pixels to respectively display red, green, and blue colors. Each of the first, second, and third sub-pixels includes a common electrode disposed on the first substrate, a sub-pixel electrode disposed on the first substrate and insulated from the common electrode, and a color filter disposed on the second substrate. The sub-pixel electrode includes a plurality of slits to form an electric field in cooperation with the common electrode, Cell gaps of the first, second, and third sub-pixels are different from each other, the cell gaps being distances between the sub-pixel electrode of the first, second, and third sub-pixels and the color filter, respectively.

Another exemplary embodiment of the present invention discloses a liquid crystal display panel which includes a first substrate, a second substrate facing the first substrate, and a liquid crystal layer disposed between the first substrate and the second substrate and including liquid crystal molecules having a negative anisotropic dielectric constant. The liquid crystal display panel is divided in a plurality of pixels arranged in a matrix form, at least one pixel of the pixels is divided in a first, a second, and a third sub-pixels in a certain direction, and the first, second, and third sub-pixels are configured to display red, green, and blue colors, respectively. Each of the first, second, and third sub-pixels includes a common electrode disposed on the first substrate, a sub-pixel electrode disposed on the common electrode and insulated from the common electrode, and a color filter disposed on the first substrate. The sub-pixel electrode includes a plurality of slits to form an electric field in cooperation with the common electrode. The liquid crystal layer is interposed between the color filter and the sub-pixel electrode. Distances from the respective color filters to the sub-pixels in the first, second, and third sub-pixels are different from each other.

It is to be understood that both the foregoing general description and the is following detailed description are exemplary and explanatory and are intended to provide further explanation of the invention as claimed.

BRIEF DESCRIPTION OF THE DRAWINGS

The above and other advantages of the present invention will become readily apparent by reference to the following detailed description when considered in conjunction with the accompanying drawings.

DETAILED DESCRIPTION OF THE ILLUSTRATED EMBODIMENTS

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood is that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
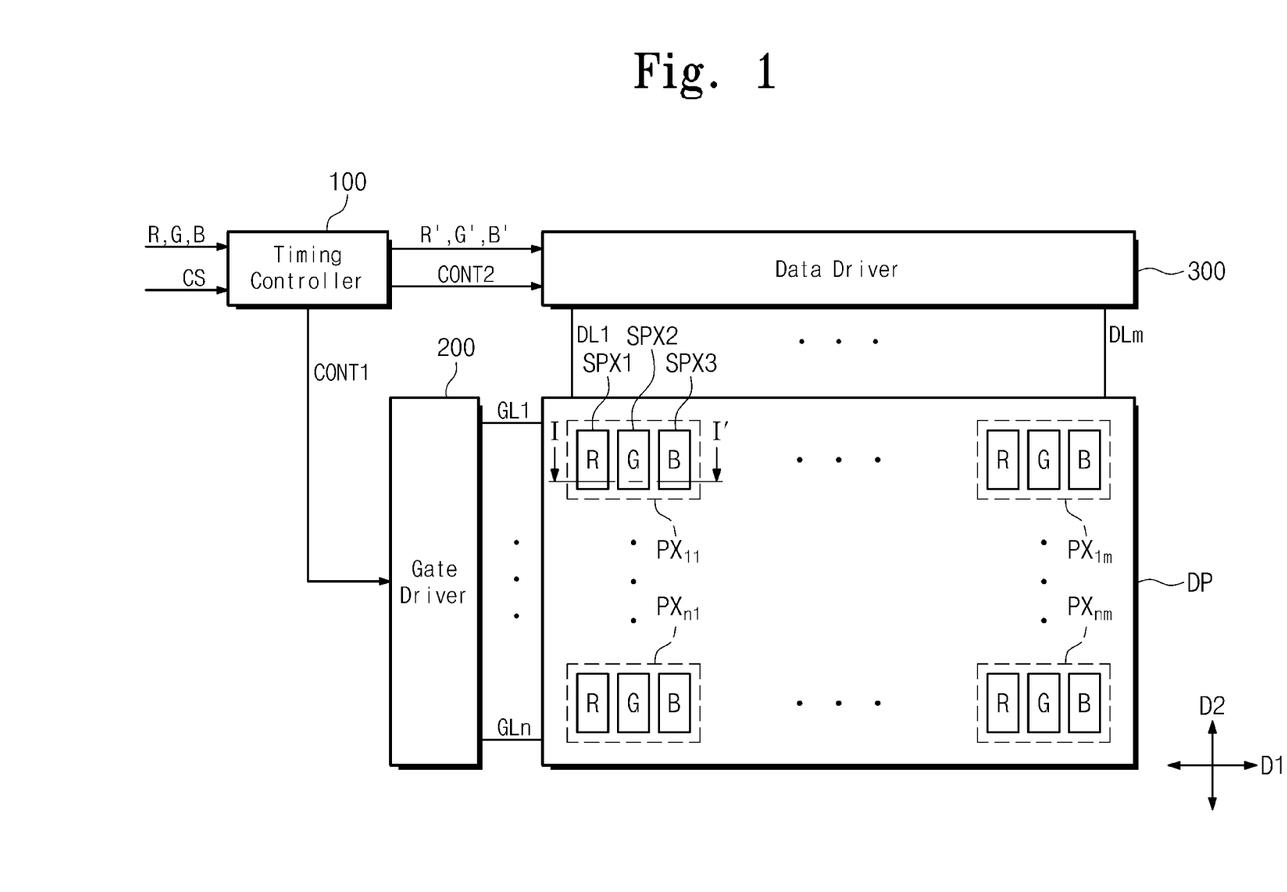
FIG. 1 is a block diagram showing a liquid crystal display according to an exemplary embodiment of the present invention.
Figure 2:
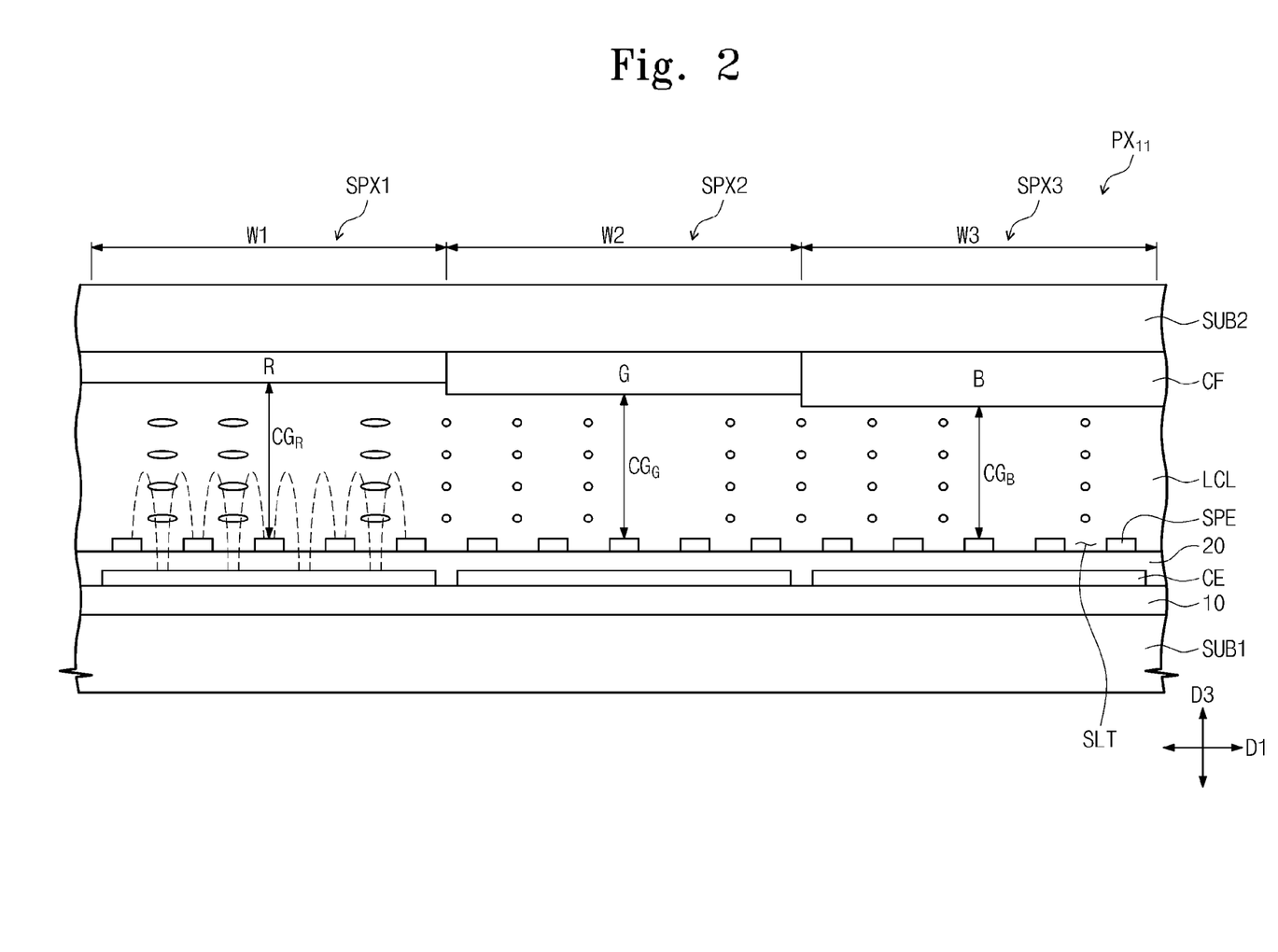
FIG. 2 is a cross-sectional view taken along line I-I' of a pixel shown in FIG. 1.

FIG. 1 is a block diagram showing a liquid crystal display according to an exemplary embodiment of the present invention, and FIG. 2 is a cross-sectional view taken along line I-I' of a pixel shown in FIG. 1.

Referring to FIG. 1, a liquid crystal display includes a timing controller 100, a gate driver 200, a data driver 300, and a display panel DP.

The timing controller 100 receives input image signals R, G, and B, and converts the input image signals R, G, and B to image data R', G', and B' appropriate to operation condition of the display panel DP. In addition, the timing controller 100 receives various control signals CS, such as a vertical synchronization signal, a horizontal synchronization signal, a main clock, a data enable signal, etc., and outputs first and second control signals CONT1 and CONT2.

The gate driver 200 applies gate signals to gate lines GL1 to GLn in response to the first control signal CONT1. The first control signal CONT1 includes a vertical start signal that starts an operation of the gate driver 200, a gate clock signal that determines an output timing of a gate voltage, and an output enable signal that determines an ON pulse width of the gate voltage.

The data driver 300 receives the second control signal CONT2 and the image data R', G', and B'. The second control signal CONT2 includes a horizontal start signal that starts an operation of the data driver 300, an inversion signal that inverts a polarity of the data voltage, and an output indicating signal that determines an output timing of the data voltage from the data driver 300. The data driver 300 converts the image data R', G', and B' to the data voltages and applies the data voltages to the data lines DL1 to DLm.

The display panel DP includes a plurality of pixels PX11 to PXnm. Each of the is pixels PX11 to PXnm includes first, second, and third sub-pixels SPX1, SPX2, and SPX3. The first, second, and third sub-pixels SPX1, SPX2, and SPX3 display red R, green G, and blue B colors, respectively.

In the exemplary embodiment, the pixels PX11 to PXnm have the same structure and configuration, and thus one pixel PX11 will be described in detail with reference to FIG. 2 as a representative example.

Referring to FIG. 2, the display panel DP includes a first substrate SUB1, a second substrate SUB2 facing the first substrate SUB1, and a liquid crystal layer LCL disposed between the first substrate SUB1 and the second substrate SUB2. The liquid crystal layer LCL includes liquid crystal molecules having a negative anisotropic dielectric constant. The gate lines GL1 to GLn and the data lines DL1 to DLm are disposed on the first substrate SUB1.

Meanwhile, as shown in FIG. 1, the gate lines GL1 to GLn extend in a first direction D1 and arranged in a second direction D2 substantially perpendicular to the first direction. The data lines DL1 to DLm extend in the second direction D2 and arranged in the first direction D1.

Each of the first, second, and third sub-pixels SPX1, SPX2, and SPX3 includes a common electrode CE and a sub-pixel electrode SPE, which are disposed on the first substrate SUB1, and color filters CF disposed on the second substrate. The color filters CF of the first, second, and third sub-pixels SPX1, SPX2, and SPX3 may have different thicknesses from each other. In addition, each of the first, second, and third sub-pixels SPX1, SPX2, and SPX3 includes a thin film transistor (not shown) to apply a pixel electrode to the sub-pixel electrode SPE.

The first, second, and third sub-pixels SPX1, SPX2, and SPX3 may have widths W1, W2, and W3 in the first direction D1, respectively, which are different from each other. Although not shown in figures, the first, second, and third sub-pixels SPX1, SPX2, and SPX3 may have the same width in the second direction D2.

The first, second, and third sub-pixels SPX1, SPX2, and SPX3 have areas which vary depending on the widths W1, W2, and W3 of the first, second, and third sub-pixels SPX1, SPX2, and SPX3 in the first direction D1. A transmittance difference between the first, second, and third sub-pixels SPX1, SPX2, and SPX3 is controlled by a ratio of the areas of the first, second, and third sub-pixels SPX1, SPX2, and SPX3. This will be described in detail later.

In addition, a black matrix through which openings are formed is further disposed on a surface of the second substrate SUB2. The areas of the first, second, and third sub-pixels SPX1, SPX2, and SPX3 are calculated by reference to an area in which the black matrix is not formed.

A first insulating layer 10 is disposed on the first substrate SUB1. The common electrode CE is disposed on the first insulating layer 10. The sub-pixel electrode SPE is disposed to be insulated from the common electrode CE. The sub-pixel electrode SPE may be disposed on a second insulating layer 20 that covers the common electrode CE. Although not shown in FIG. 2, each of the first and second insulating layers 10 and 20 may be configured to include a plurality of thin layers.

The sub-pixel electrode SPE forms an electric field in cooperation with the common electrode CE. The sub-pixel electrode SPE includes a plurality of slits SLT. As shown in FIG. 2, the common electrode CE and the sub-pixel electrode SPE form a fringe field with the slits SLT.

When the fringe field is generated between the common electrode CE and the first is sub-pixel SPX1, the liquid crystal molecules of the liquid crystal layer LCL are rotated in plane.

Since the liquid crystal molecules having the negative anisotropic are polarized in a direction substantially perpendicular to the fringe field, an inclined angle of the liquid crystal molecules is not changed. Accordingly, the liquid crystal display has superior viewing angle and high transmittance.

The color filters CF of the first, second, and third sub-pixels SPX1, SPX2, and SPX3 have different colors from each other. The color filters CF of the first, second, and third sub-pixels SPX1, SPX2, and SPX3 may have the red R, green G, and blue B colors, respectively. Thus, the lights passing through the first, second, and third sub-pixels SPX1, SPX2, and SPX3 have different wavelengths from each other.

As shown in FIG. 2, the first, second, and third sub-pixels SPX1, SPX2, and SPX3 have different cell gaps $CG_R$, $CG_G$, and $CG_B$ from each other. The cell gaps $CG_R$, $CG_G$, and $CG_B$ are the same as distances, in which the light travels, i.e., distances between the sub-pixel electrode SPE of the first, second, and third sub-pixels SPX1, SPX2, and SPX3 and the color filters CF.

The retardation values of the lights passing through the first, second, and third sub-pixels SPX1, SPX2, and SPX3 are decided depending on birefringences of the lights passing through the first, second, and third sub-pixels SPX1, SPX2, and SPX3 and the cell gaps $CG_R$, $CG_G$, and $CG_B$.

That is, the retardation values are obtained by the following Equation.

$$\text{Retardation value} = \text{birefringence}(\Delta n) \times \text{cell gap}(d) \quad \text{Equation}$$

The birefringences of the lights depend on the wavelengths of the lights. For instance, the birefringence of the light at the wavelength of about 650 nm is about 0.1012, the birefringence of the light at the wavelength of about 550 nm is about 0.1066, and the birefringence of the light at the wavelength of about 450 nm is about 0.1162.

The relation between the cell gaps $CG_R$, $CG_G$, and $CG_B$ the first, second, and third sub-pixels SPX1, SPX2, and SPX3 and the retardation values of the lights passing through the first, second, and third sub-pixels SPX1, SPX2, and SPX3 will be described in detail later.

Figure 3A:
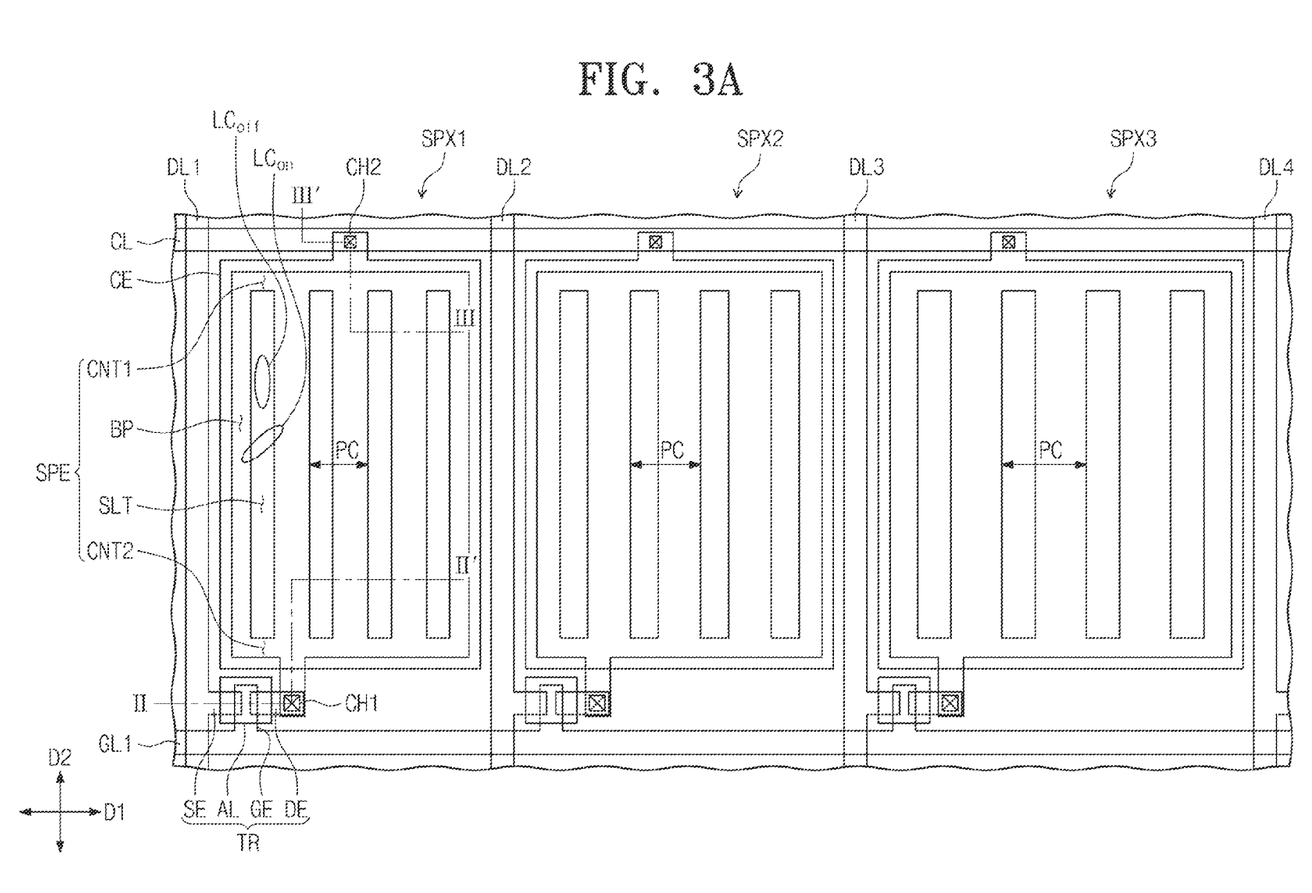
FIG. 3A is a plan view showing a first substrate corresponding to a pixel shown in FIG. 1.
Figure 3B:
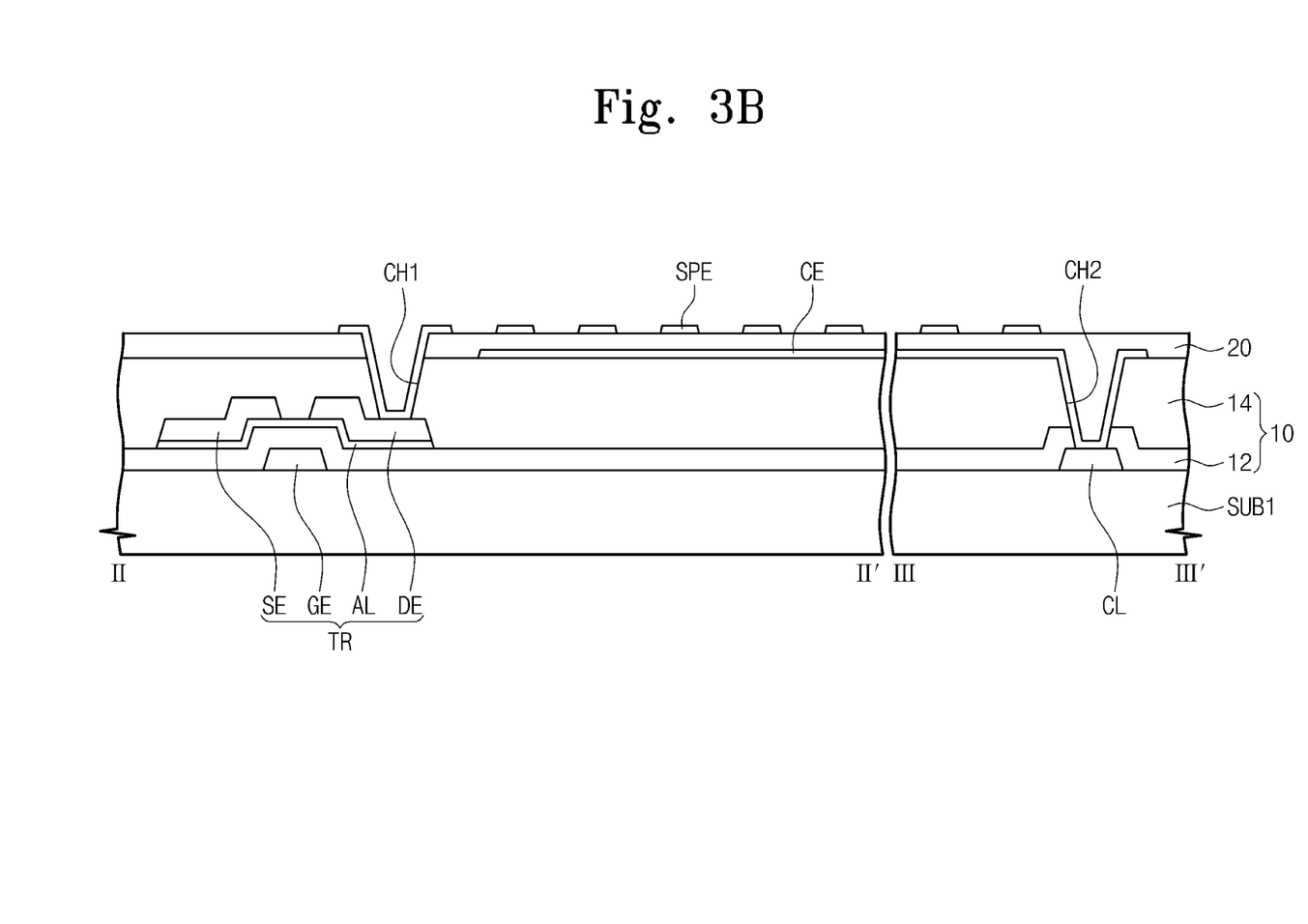
FIG. 3B is a cross-sectional view taken along lines II-II' and III-III' of FIG. 3A.

FIG. 3A is a plan view showing a first substrate corresponding to a pixel shown in FIG. 1, and FIG. 3B is a cross-sectional view taken along lines II-II' and III-III' of FIG. 3A. The first, second, and third sub-pixels SPX1, SPX2, and SPX3 may have the same structure and function, and thus the first sub-pixel SPX1 shown in FIGS. 3A and 3B will be described in detail as a representative example.

Referring to FIG. 3A, the thin film transistor TR includes a gate electrode GE, a semiconductor layer AL, a source electrode SE, and a drain electrode DE.

The gate electrode GE is branched from a corresponding gate line of the gate lines GL1 to GLn and the source electrode SE is branched from a corresponding data line DL1 of the data lines DL1 to DLm. The drain electrode DE is disposed to be spaced apart from the source electrode SE and connected to the sub-pixel electrode SPE.

The thin film transistor TR is turned on in response to the gate signal applied to the corresponding gate line GL1, so that the thin film transistor TR applies the data voltage applied to the corresponding data line DL1 to the sub-pixel electrode SPE.

The sub-pixel electrode SPE includes the slits SLT and a plurality of branch portions BP alternately arranged with the slits SLT. The sub-pixel electrode SPE has a rectangular shape when viewed in a plan view. First ends of the branch portions BP are is connected to each other by a first connection portion CNT1 and second ends of the branch portions BP are connected to each other by a second connection portion CNT2. The second connection portion CNT2 is connected to the thin film transistor TR through the first contact hole CH1.

In the present exemplary embodiment, a sum of a width of one slit of the slits SLT and a width of one branch portion of the branch portions BP, which is adjacent to the one slit, is referred to as a pitch PC. As illustrated in FIG. 3A, the first, second, and third sub-pixels SPX1, SPX2, and SPX3 may have sub-pixel electrodes SPE having different pitches from each other. The sub-pixel having a relatively small pitch has a relatively higher transmittance than that of the sub-pixel having a relatively large pitch. The transmittance difference of the first, second, and third sub-pixels SPX1, SPX2, and SPX3 may be controlled by controlling a pitch ratio of the sub-pixel electrodes SPE of the first, second, and third sub-pixels SPX1, SPX2, and SPX3. This will be described in detail later.

The corresponding gate line GL1 and the common line CL are respectively disposed at lower and upper sides of the sub-pixel electrode SPE when viewed in a plan view. The common line CL is electrically connected to the common electrode CE through the second contact hole CH2. In addition, the corresponding data line DL1 and the other one data line DL2 adjacent to the corresponding data line DL1 are respectively disposed at left and right sides of the sub-pixel electrode SPE when viewed in a plan view.

A first liquid crystal LCoff indicates an arrangement of the liquid crystal molecules when the pixel voltage is not applied to the sub-pixel electrode SPE, and a second liquid crystal LCon indicates the arrangement of the liquid crystal molecules when the pixel voltage is applied to the sub-pixel electrode SPE. The first liquid crystal LCoff is arranged is substantially in parallel with the slits SLT and the second liquid crystal LCon is inclined at a predetermined angle with respect to the slits SLT.

As shown in FIG. 3B, the gate electrode GE and the common line CL are disposed on the surface of the first substrate SUB1. A first insulating thin layer 12 covers the gate electrode GE and the common line CL.

The semiconductor layer AL is disposed on the first insulating thin layer 12 and overlapped with the gate electrode GE. The drain electrode DE and the source electrode SE are disposed on the first insulating thin layer 12. Each of the drain electrode DE and the source electrode SE is partially overlapped with the semiconductor layer AL.

A second insulating thin layer 14 is disposed on the first insulating thin layer 12 to cover the semiconductor layer AL, the drain electrode DE, and the source electrode SE. The common electrode CE is disposed on the second insulating thin layer 14. The common electrode CE is connected to the common line CL through the second contact hole CH2 formed through the first insulating thin layer 12 and the second insulating thin layer 14.

A third insulating thin layer 20 is disposed on the second insulating thin layer 14 to cover the common electrode CE. The sub-pixel electrode SPE is disposed on the third insulating thin layer 20. The sub-pixel electrode SPE is connected to the drain electrode DE through a first contact hole CH1 formed through the second insulating thin layer 14 and the third insulating thin layer 20.

Figure 4A:
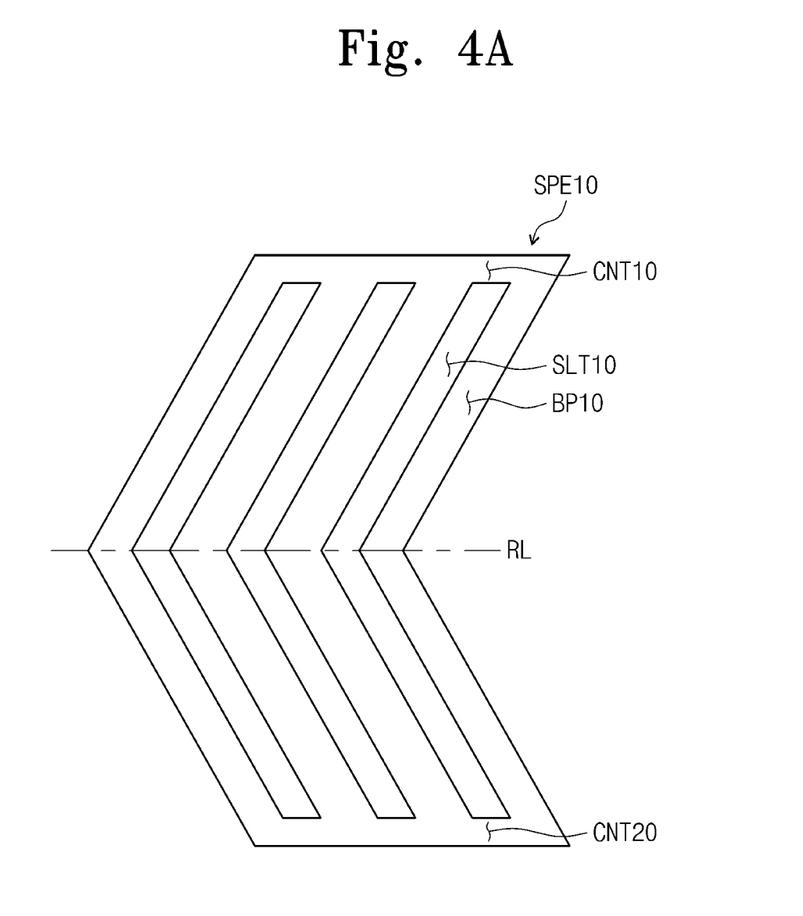
FIGS. 4A and 4B are plan views showing sub-pixel electrodes according to exemplary embodiments of the present invention.
Figure 4B:
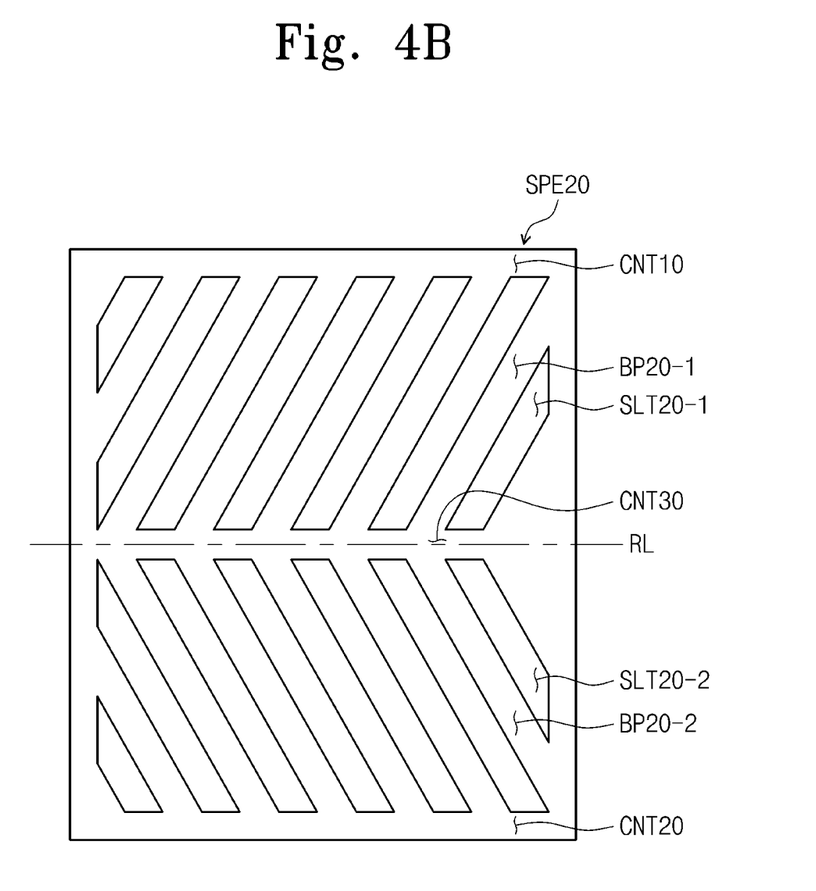

FIGS. 4A and 4B are plan views showing sub-pixel electrodes according to exemplary embodiments of the present invention. The sub-pixel electrode SPE of the first sub-pixel SPX1 described with reference to FIGS. 3A and 3B may have various shapes as shown in FIGS. 4A and 4B.

Referring to FIG. 4A, a sub-pixel electrode SPE10 includes a plurality of slits SLT10 and a plurality of branch portions BP10 alternately arranged with the slits SLT10. First ends of the branch portions BP10 are connected to each other by a first connection portion CNT10 and second ends of the branch portions BP10 are connected to each other by a second connection portion CNT20.

The sub-pixel electrode SPE10 has a bent shape with respect to a reference line RL crossing the sub-pixel electrode SPE10. Accordingly, the sub-pixel electrode SPE10 is divided into a first area and a second area with respect to the reference line RL. The slits SLT in the first area are inclined at an angle with respect to the reference line RL, which is different from an angle at which the slits SLT in the second area are inclined with respect to the reference line RL.

The liquid crystal molecules are arranged in different directions in accordance with the first and second areas of the slits SLT10. The first sub-pixel SPX1 is divided into two domains, and thus a viewing angle of the first sub-pixel SPX1 is improved.

Referring to FIG. 4B, a sub-pixel electrode SPE20 includes a plurality of slits SLT20-1 and SLT20-2 and a plurality of branch portions BP20-1 and BP20-2.

The slits SLT20-1 and SLT20-2 are classified into first slits SLT20-1 and second slits SLT20-2. The first slits SLT20-1 are disposed at upper portion of the sub-pixel electrode SPE20 with respect to a reference line RL crossing the sub-pixel electrode SPE20, and second slits SLT20-2 are disposed at lower portion of the sub-pixel electrode SPE20 with respect to the reference line RL crossing the sub-pixel electrode SPE20. In other words, the first slits SLT20-1 and the second slits SLT20-2 are respectively disposed at the upper and lower portions with respect to a third connection portion CNT30 overlapped with the reference line RL.

The first slits SLT20-1 are inclined at an angle with respect to the reference line RL, which is different from an angle at which the second slits SLT20-2 are inclined with respect to the reference line RL. In addition, the first slits SLT20-1 may be symmetrical with the second slits SLT20-2 with reference line RL.

The branch portions BP20-1 and BP20-2 are classified into first branch portions BP20-1 and second branch portions BP20-2. The first branch portions BP20-1 are alternately arranged with the first slits SLT20-1 and the second branch portions B020-2 are alternately arranged with the second slits SLT20-2.

The liquid crystal molecules are divided into two liquid crystal molecule groups arranged in different directions from each other along the first slits SLT20-1 and the second slits SLT20-2, respectively. Accordingly, the first sub-pixel SPX1 is divided into two domains and projects images to different directions, thereby improving the viewing angle.

Figure 5A:
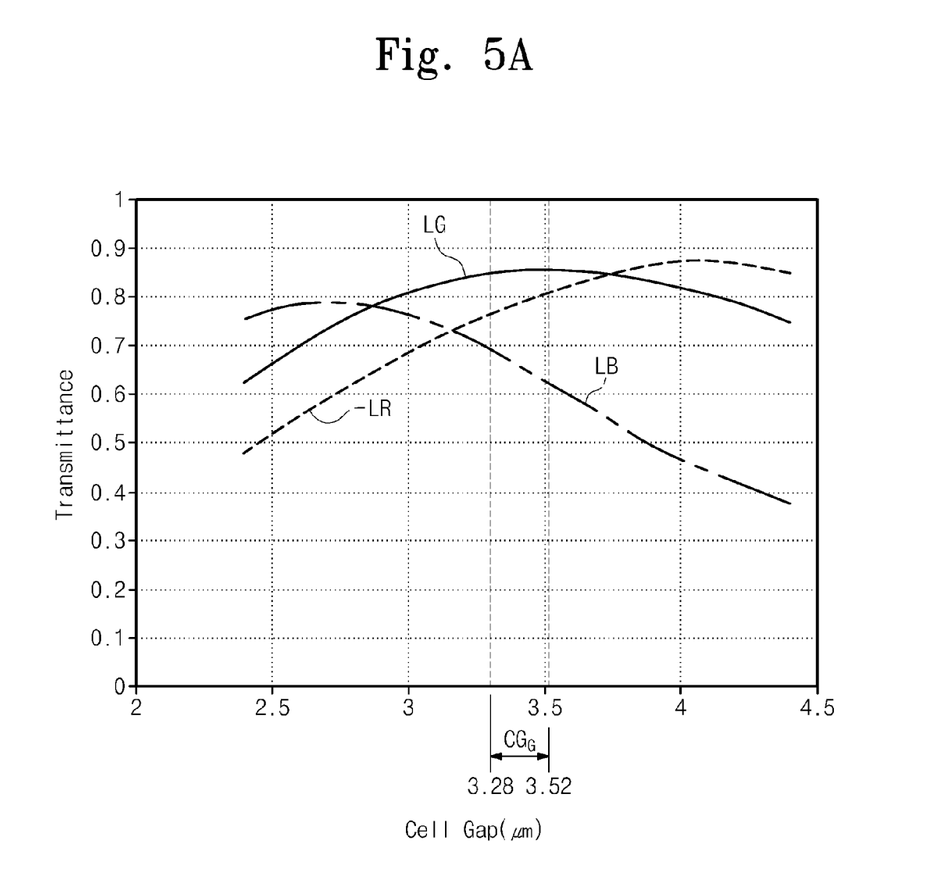
FIG. 5A is a graph showing a relation between a transmittance and cell gaps of first, second, and third sub-pixels.
Figure 5B:
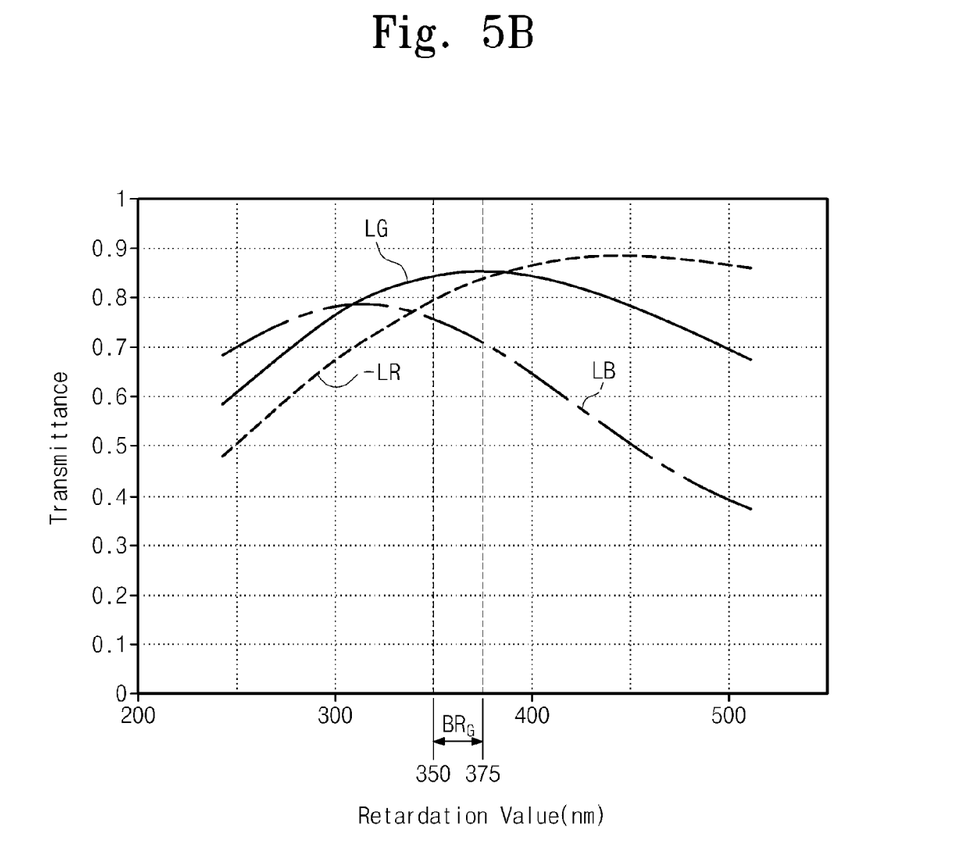
FIG. 5B is a graph showing a relation between a transmittance and retardation values of light passing through first, second, and third sub-pixels.
Figure 6A:
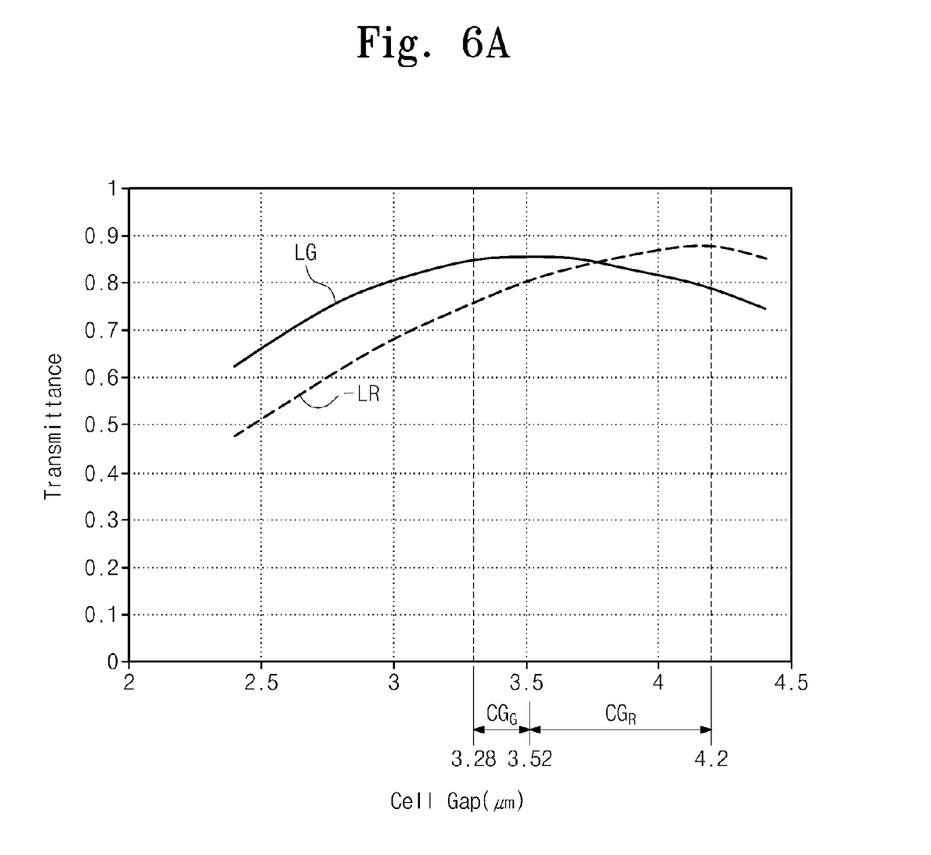
FIG. 6A is a graph showing a relation between a transmittance and a cell gap of first and second pixels.
Figure 6B:
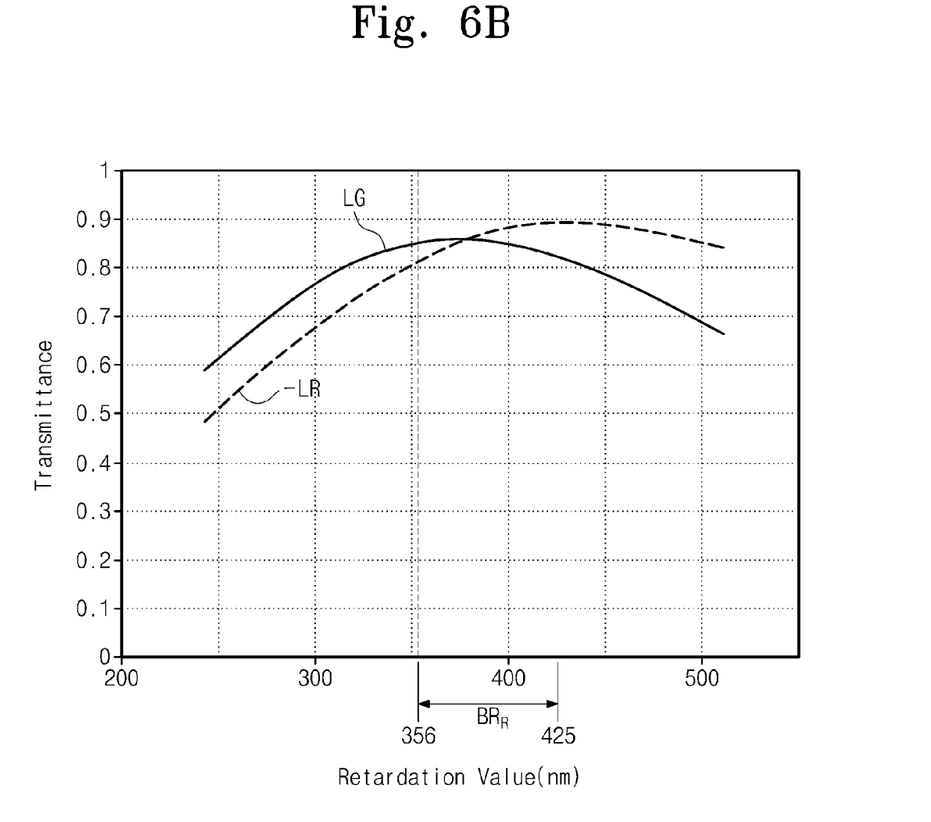
FIG. 6B is a graph showing a relation between a transmittance and a cell gap of light passing through first and second sub-pixels.
Figure 7A:
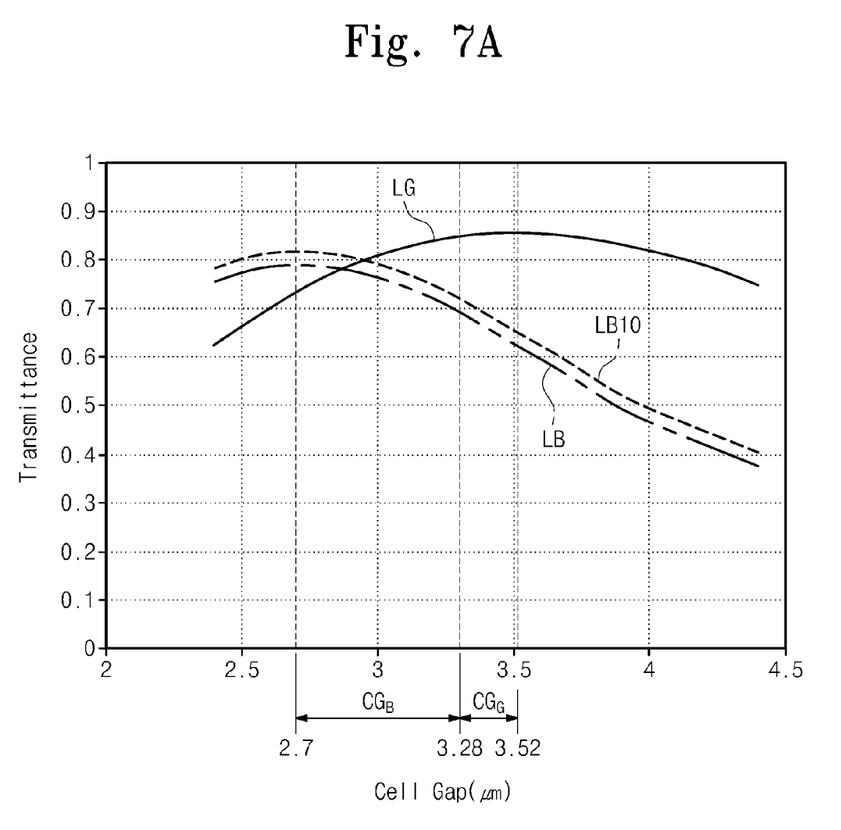
FIG. 7A is a graph showing a relation between a transmittance and a cell gap of second and third sub-pixels.
Figure 7B:
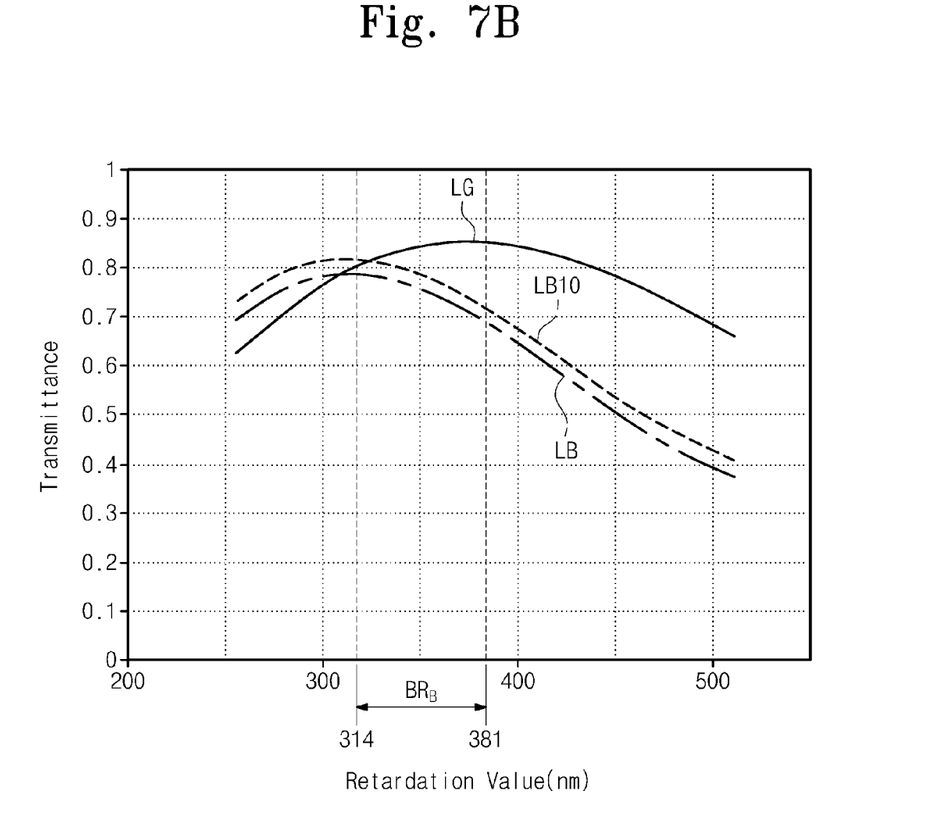
FIG. 7B is a graph showing a relation between a transmittance and retardation values of light passing through second and third sub-pixels.

FIG. 5A is a graph showing a relation between a transmittance and cell gaps of first, second, and third sub-pixels, and FIG. 5B is a graph showing a relation between a transmittance and retardation values of light passing through first, second, and third sub-pixels. FIG. 6A is a graph showing a relation between a transmittance and a cell gap of first and second pixels, and FIG. 6B is a graph showing a relation between a transmittance and a cell gap of light passing through first and second sub-pixels. FIG. 7A is a graph showing a relation between a transmittance and a cell gap of second and third sub-pixels, and FIG. 7B is a graph showing a relation between a transmittance and retardation values of light passing through second and third sub-pixels.

In FIGS. 5A to 7B, a first graph LR represents a variation of the transmittance of the light passing through the first sub-pixel SPX1 (refer to FIG. 2) and having a wavelength of is about 650 nm, a second graph LG represents a variation of the transmittance of the light passing through the second sub-pixel SPX2 (refer to FIG. 2) and having a wavelength of about 550 nm, and a third graph LB represents a variation of the transmittance of the light passing through the third sub-pixel SPX3 (refer to FIG. 2) and having a wavelength of about 450 nm, As shown in FIG. 5A, in the case of the first graph LR, the increase in the cell gap also generally increases the transmittance. The second graph LG has a quadratic curved shape. In the case of the third graph LB, the increase in the cell gap generally decreases the transmittance. In this case, the first, second, and third graphs LR, LG, and LB are measured with respect to the sub-pixel electrode having the pitch PC of about 8 μm.

In order to enhance the transmittance of the liquid crystal display according to the exemplary embodiment, the first, second, and third sub-pixels SPX1, SPX2, and SPX3 have the cell gaps where the transmittance is high. That is, the first, second, and third sub-pixels SPX1, SPX2, and SPX3 have different cell gaps from each other.

Referring to FIG. 5A, the cell gap $CG_G$ (refer to FIG. 2) of the second sub-pixel SPX2 for higher transmittance, which is related to the enhance of the transmittance of the second sub-pixel SPX2, is greater than about 3.28 μm and equal to or smaller than about 3.52 μm. In addition, the retardation value of the light passing through the second sub-pixel SPX2 and having the wavelength of about 550 nm is greater than about 350 nm and equal to or smaller than 375 nm as shown in FIG. 5B.

As shown in FIG. 6A, the cell gap $CG_R$ (refer to FIG. 2) of the first sub-pixel SPX1, which is related to the enhance of the transmittance of the first sub-pixel SPX1, is greater than about 3.52 μm and equal to or smaller than about 4.2 μm. In addition, the retardation value of the light passing through the first sub-pixel SPX1 and having the wavelength of about 650 nm is greater than about 356 nm and equal to or smaller than 425 nm as shown in FIG. 6B.

The cell gap $CG_R$ of the first sub-pixel SPX1 is greater than the cell gap $CG_G$ of the second sub-pixel SPX2, and thus the transmittance of the first sub-pixel SPX1 and the second sub-pixel SPX2 is enhanced.

Referring to FIG. 7A, the cell gap $CG_B$ (refer to FIG. 2) of the third sub-pixel SPX3, which is related to the enhance of the transmittance of the third sub-pixel SPX3, is equal to or greater than about 2.7 μm and equal to or smaller than about 3.28 μm. In addition, the retardation value of the light passing through the third sub-pixel SPX3 and having the wavelength of about 450 nm is equal to or greater than about 314 nm and equal to or smaller than 381 nm as shown in FIG. 7B.

The cell gap $CG_B$ of the third sub-pixel SPX3 is smaller than the cell gap $CG_G$ of the second sub-pixel SPX2, and thus the transmittance of the third sub-pixel SPX3 is enhanced.

In addition, in the different cell gaps of the first, second, and third sub-pixels SPX1, SPX2, and SPX3, the wavelengths of the light passing through the first, second, and third sub-pixels SPX1, SPX2, and SPX3 may have different retardation values from each other.

When the cell gap $CG_R$ of the first sub-pixel SPX1 is greater than about 3.71 μm and equal to or smaller than 4.2 μm, the retardation value of the light passing through the first sub-pixel SPX1 and having the wavelength of about 650 nm is greater than 375 nm and equal to or smaller than 425 nm. When the cell gap $CG_G$ of the second sub-pixel SPX2 is greater than about 3.28 μm and equal to or smaller than 3.52 μm, the retardation value of the light passing through the second sub-pixel SPX2 and having the wavelength of about 550 nm is greater than 350 nm and equal to or smaller than 375 nm. When the cell gap $CG_B$ of the third sub-pixel SPX3 is greater than about 2.7 μm and equal to or smaller than 3.01 μm, the retardation value of the is light passing through the third sub-pixel SPX3 and having the wavelength of about 450 nm is equal to or greater than 314 nm and equal to or smaller than 350 nm.

In the case that the first, second, and third sub-pixels SPX1, SPX2, and SPX3 respectively have the cell gaps as the above-mentioned range, the transmittance of the third sub-pixel SPX3 is smaller than the transmittance of the first sub-pixel SPX1 and the second sub-pixel SPX2 even though the transmittance of each of the first, second, and third sub-pixels SPX1, SPX2, and SPX3 is enhanced.

In the exemplary embodiment, the pitch PC (refer to FIG. 3A) of the third sub-pixel SPX3 may be set to be smaller than the pitch PC of the first sub-pixel SPX1 and the second sub-pixel SPX2 so as to reduce the transmittance difference between the third sub-pixel SPX3 and the first and second sub-pixels SPX1 and SPX2.

In FIGS. 7A and 7B, a fourth graph LB10 represents the transmittance of the third sub-pixel SPX3 including the sub-pixel electrode SPE having the pitch PC of about 7 μm. The transmittance according to the fourth graph LB 10 is higher than the transmittance according to the third graph LB. Accordingly, the transmittance difference between the third sub-pixel SPX3 and the first and second sub-pixels SPX1 and SPX2 is reduced.

In addition, although not shown in figures, when the third sub-pixel SPX3 has the area larger than the area of the first and second sub-pixels SPX1 and SPX2, the transmittance difference between the third sub-pixel SPX3 and the first and second sub-pixels SPX1 and SPX2 is reduced. This will be described in detail with reference to Tables later.

Table 1 described below represents the transmittance according to the cell gap and the retardation value of liquid crystal displays.

TABLE 1

|  | Sub-pixel | Cell gap (μm) | Retardation value (nm) | Area ratio | Pitch (μm) | Transmittance (%) |
|---|---|---|---|---|---|---|
| 1st LCD | SPX1 | 3 | 304 | 100 | 8 | 100 |
|  | SPX2 | 3 | 320 | 100 | 8 | 100 |
|  | SPX3 | 3 | 349 | 100 | 8 | 100 |
| 2nd LCD | SPX1 | 4.2 | 425 | 100 | 8 | 128 |
|  | SPX2 | 3.5 | 373 | 100 | 8 | 106 |
|  | SPX3 | 2.8 | 325 | 100 | 8 | 103.1 |
| 3rd LCD | SPX1 | 4 | 405 | 100 | 8 | 127.2 |
|  | SPX2 | 3.5 | 373 | 100 | 8 | 106 |
|  | SPX3 | 3 | 349 | 100 | 8 | 100 |

In Table 1, the first liquid crystal display is a liquid crystal display having a uniform cell gap, and the second and third liquid crystal displays have various cell gaps according to the exemplary embodiments of the present invention.

The second and third liquid crystal displays achieve better transmittance than the transmittance of the first liquid crystal display since the first, second, and third sub-pixels SPX1, SPX2, and SPX3 have different cell gaps from each other.

Table 2 described below represents the transmittance according to the cell gap, the retardation value, and the pitch of liquid crystal displays. In order to reduce the transmittance difference of the first, second, and third sub-pixels SPX1, SPX2, and SPX3, the sub-pixel having the relatively small transmittance should have the pitch smaller than the pitch of the sub-pixel having the relatively large transmittance.

TABLE 2

|  | Sub-pixel | Cell gap (μm) | Retardation value (nm) | Area ratio | Pitch (nm) | Transmittance (%) |
|---|---|---|---|---|---|---|
| 4th LCD | SPX1 | 4.2 | 425 | 100 | 8 | 128 |
|  | SPX2 | 3.5 | 373 | 100 | 8 | 106 |
|  | SPX3 | 2.8 | 325 | 100 | 7 | 107.1 |
| 5th LCD | SPX1 | 4 | 405 | 100 | 8 | 127.2 |
|  | SPX2 | 3.5 | 373 | 100 | 8 | 106 |
|  | SPX3 | 3 | 349 | 100 | 7 | 103.6 |

As shown in Table 2, the third sub-pixel SPX3 of the fourth and fifth liquid crystal displays have the pitch smaller than the pitch of the first and second sub-pixels SPX1 and SPX2, so that the third sub-pixel SPX3 has the transmittance higher than the transmittance of the second and third liquid crystal displays. Thus, the transmittance difference between the first, second, and third sub-pixels SPX1, SPX2, and SPX3 of the fourth and fifth liquid crystal displays is reduced.

Table 3 described below represents the transmittance according to the cell gap, the retardation value, the pitch, and the area ratio of liquid crystal displays. In order to reduce the transmittance difference of the first, second, and third sub-pixels SPX1, SPX2, and SPX3, the sub-pixel having the relatively small transmittance should have the area larger than the pitch of the sub-pixel having the relatively large transmittance.

TABLE 3

|  | Sub-pixel | Cell gap (μm) | Retardation value (nm) | Area ratio | Pitch (nm) | Transmittance (%) |
|---|---|---|---|---|---|---|
| 6th LCD | SPX1 | 4.2 | 425 | 87.8 | 8 | 113 |
|  | SPX2 | 3.5 | 325 | 106.7 | 8 | 113 |
|  | SPX3 | 2.8 | 283 | 105.6 | 7 | 113 |
| 7th LCD | SPX1 | 4 | 405 | 87.5 | 8 | 111.3 |
|  | SPX2 | 3.5 | 373 | 105.1 | 8 | 111.3 |
|  | SPX3 | 3 | 349 | 107.4 | 7 | 111.3 |

As shown in Table 3, the second and third sub-pixels SPX2 and SPX3 of the sixth and seventh liquid crystal displays have the area larger than the area of the first sub-pixel SPX 1 having the relatively high transmittance. Therefore, the transmittance difference between the first, second, and third sub-pixels SPX1, SPX2, and SPX3 of the sixth and seventh liquid crystal displays is reduced when compared to the fourth and fifth liquid crystal displays.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display, comprising:
 a first substrate;
 a second substrate facing the first substrate;
 a liquid crystal layer disposed between the first substrate and the second substrate and comprising liquid crystal molecules having a negative anisotropic dielectric constant; and
 first, second, and third sub-pixels to respectively display red, green, and blue colors, each of the first, second, and third sub-pixels comprising:
 a common electrode disposed on the first substrate,
 a sub-pixel electrode disposed on the first substrate and insulated from the common electrode, the sub-pixel electrode comprising a plurality of slits to form an electric field in cooperation with the common electrode, and
 a color filter disposed on the second substrate,
 wherein:
 cell gaps of the first, second, and third sub-pixels are different from each other, the cell gaps being distances between the sub-pixel electrode of the first, second, and third sub-pixels and the color filter, respectively;
 the first, second, and third sub-pixels have substantially the same optical transmittance;
 an area ratio of the third sub-pixel is greater than an area ratio of the second sub-pixel;
 the area ratio of the second sub-pixel is greater than an area ratio of the first sub-pixel; and
 a pitch of the sub-pixel electrode of the third sub-pixel is less than a pitch of the sub-pixel electrode of the first and second sub-pixels.

2. The liquid crystal display of claim 1, wherein a cell gap of the first sub-pixel is greater than a cell gap of the second sub-pixel and a cell gap of the third sub-pixel, and the cell gap of the second sub-pixel is greater than the cell gap of the third sub-pixel.

3. The liquid crystal display of claim 2, wherein the cell gap of the first sub-pixel is greater than about 3.52 µm and equal to or less than about 4.2 µm, the cell gap of the second sub-pixel is greater than about 3.28 µm and equal to or less than about 3.52 µm, and the cell gap of the third sub-pixel is equal to or greater than about 2.7 µm and equal to or less than about 3.28 µm.

4. The liquid crystal display of claim 2, wherein a light passing through the first sub-pixel has a retardation value greater than a retardation value of a light passing through the second sub-pixel and a retardation value of light passing through the third sub-pixel, and the light passing through the second sub-pixel has the retardation value greater than the retardation value of the light passing through the third sub-pixel.

5. The liquid crystal display of claim 4, wherein the light passing through the first sub-pixel and having a wavelength of about 650 nm has the retardation value greater than about 375 nm and equal to or less than about 425 nm, the light passing through the second sub-pixel and having a wavelength of about 550 nm has the retardation value greater than about 350 nm and equal to or less than about 375 nm, and the light passing through the third sub-pixel and having a wavelength of about 450 nm has the retardation value equal to or greater than about 314 nm and equal to or less than about 350 nm.

6. The liquid crystal display of claim 5, wherein the cell gap of the first sub-pixel is greater than about 3.71 µm and equal to or less than about 4.2 µm, the cell gap of the second sub-pixel is greater than about 3.28 µm and equal to or less than about 3.52 µm, and the cell gap of the third sub-pixel is equal to or greater than about 2.7 µm and equal to or less than about 3.01 µm.

7. The liquid crystal display of claim 2, wherein the sub-pixel electrode comprises a plurality of branch portions alternately arranged with the slits.

8. The liquid crystal display of claim 7, wherein a sum of a width of one slit of the slits and a width of one branch portion of the branch portions, which is adjacent to the one slit, is defined as a pitch, and a pitch of the sub-pixel electrode of the third sub-pixel is less than a pitch of the sub-pixel electrode of the first and second sub-pixels.

9. The liquid crystal display of claim 2, wherein the third sub-pixel has an area greater than an area of the first sub-pixel when viewed in a plan view.

10. The liquid crystal display of claim 9, wherein the second sub-pixel has an area greater than an area of the first sub-pixel when viewed in a plan view.

11. The liquid crystal display of claim 2, further comprising a plurality of gate lines disposed on the first substrate and a plurality of data lines disposed on the first substrate and insulated from the gate lines while crossing the gate lines, wherein each of the first, second, and third sub-pixels further comprises a thin film transistor connected to a corresponding gate line of the gate lines and a corresponding data line of the data lines to apply a data signal to the sub-pixel electrode.

12. The liquid crystal display of claim 11, wherein each of the slits is divided into a first area and a second area by a reference line crossing the sub-pixel electrode, and the first area of each of the slits is inclined at an angle with respect to the reference line, which is different from an angle at which the second area of each of the slits is inclined with respect to the reference line.

13. The liquid crystal display of claim 11, wherein the slits are divided into a first slit group and a second slit group by a reference line crossing the sub-pixel electrode, the first slit group and the second slit group are disposed at different sides of the reference line, and an angle between the first slit group and the reference line is different from an angle between the second slit group and the reference line.

14. The liquid crystal display of claim 1, wherein:
 a light passing through the first sub-pixel and having a wavelength of about 650 nm has a retardation value greater than about 356 nm and equal to or less than about 425 nm;
 a light passing through the second sub-pixel and having a wavelength of about 550 nm has a retardation value greater than about 350 nm and equal to or less than about 375 nm; and
 a light passing through the third sub-pixel and having a wavelength of about 450 nm has a retardation value equal to or greater than about 314 nm and equal to or less than about 381 nm.

15. A liquid crystal display panel, comprising:
 a first substrate;
 a second substrate facing the first substrate; and
 a liquid crystal layer disposed between the first substrate and the second substrate and comprising liquid crystal molecules having a negative anisotropic dielectric constant,
 wherein the liquid crystal display panel is divided in a plurality of pixels arranged in a matrix form, at least one pixel of the pixels is divided in a first, a second, and a third sub-pixels in a certain direction, the first, second, and third sub-pixels are configured to display red, green, and blue colors, respectively, and each of the first, second, and third sub-pixels comprises:

a common electrode disposed on the first substrate;

a sub-pixel electrode disposed on the common electrode and insulated from the common electrode, the sub-pixel electrode comprising a plurality of slits to form an electric field in cooperation with the common electrode; and a color filter disposed on the second substrate, the liquid crystal layer being interposed between the color filter and the sub-pixel electrode, wherein:

distances from the respective color filters to the sub-pixels in the first, second, and third sub-pixels are different from each other;

the first, second, and third sub-pixels have substantially the same optical transmittance;

an area ratio of the third sub-pixel is greater than an area ratio of the second sub-pixel;

the area ratio of the second sub-pixel is greater than an area ratio of the first sub-pixel; and a pitch of the sub-pixel electrode of the third sub-pixel is less than a pitch of the sub-pixel electrode of the first and second sub-pixels.

16. The liquid crystal display panel of claim 15, wherein the color filters of the first, second, and third sub-pixels have different thicknesses from each other.

17. The liquid crystal display panel of claim 16, wherein the sub-pixel electrodes of the first, second, and third sub-pixels have different widths from each other.

18. The liquid crystal display of claim 15, wherein the sub-pixel electrodes of the first, second, and third sub-pixels have different pitches from each other.

19. The liquid crystal display of claim 15, wherein, a light passing through the first sub-pixel and having a wavelength of about 650 nm has a retardation value greater than about 356 nm and equal to or less than about 425 nm;

a light passing through the second sub-pixel and having a wavelength of about 550 nm has a retardation value greater than about 350 nm and equal to or less than about 375 nm; and a light passing through the third sub-pixel and having a wavelength of about 450 nm has a retardation value equal to or greater than about 314 nm and equal to or less than about 381 nm.

\* \* \* \* \*